(12) United States Patent
Rajagopalan et al.

(10) Patent No.: US 10,178,170 B2
(45) Date of Patent: Jan. 8, 2019

(54) BROWSER-BASED VIRTUAL MEDIA ADMINISTRATION

(71) Applicant: DELL PRODUCTS, L.P., Round Rock, TX (US)

(72) Inventors: Harikrishnan A. Rajagopalan, Bangalore (IN); Rajeshkumar Ichchhubhai Patel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 453 days.

(21) Appl. No.: 14/853,960

(22) Filed: Sep. 14, 2015

(65) Prior Publication Data

US 2017/0078388 A1  Mar. 16, 2017

(51) Int. Cl.
*G06F 15/16* (2006.01)
*H04L 29/08* (2006.01)
*G06F 17/30* (2006.01)
*H04L 12/24* (2006.01)

(52) U.S. Cl.
CPC .... *H04L 67/1097* (2013.01); *G06F 17/30194* (2013.01); *H04L 41/0253* (2013.01); *H04L 41/22* (2013.01)

(58) Field of Classification Search
CPC .................................................. G06F 9/5077
USPC ........................................................ 709/203
See application file for complete search history.

(56) References Cited

U.S. PATENT DOCUMENTS

| | | | |
|---|---|---|---|
| 6,356,968 B1 | 3/2002 | Kishon | |
| 7,376,713 B2 | 5/2008 | Van Hensbergen et al. | |
| 7,458,075 B2 | 11/2008 | Keys | |
| 7,555,570 B2 | 6/2009 | Hickey et al. | |
| 7,899,090 B2 | 3/2011 | Mittapalli et al. | |
| 8,449,056 B2 | 7/2013 | Kang et al. | |
| 8,635,304 B2 | 1/2014 | Konetski et al. | |
| 2007/0174526 A1* | 7/2007 | Blackwell | G06F 13/12 710/73 |
| 2008/0133654 A1* | 6/2008 | Kim | H04L 69/16 709/203 |
| 2011/0161482 A1 | 6/2011 | Bonola et al. | |
| 2012/0198349 A1 | 8/2012 | Chandrasekhar et al. | |
| 2012/0259900 A1 | 10/2012 | Kacin et al. | |
| 2014/0108667 A1 | 4/2014 | Reddy et al. | |
| 2014/0137212 A1 | 5/2014 | Konetski et al. | |
| 2015/0019759 A1 | 1/2015 | Tran et al. | |

(Continued)

*Primary Examiner* — Hamza N Algibhah

(74) *Attorney, Agent, or Firm* — Isidore PLLC

(57) ABSTRACT

An information handling system (IHS) provides graphical user interface (GUI)-controlled virtual media between a networked management IHS and a managed IHS. At least one user input component is capable of manipulating and/or interfacing with one or more items on a GUI presented on a display device. A network interface enables communication with a network and a managed IHS that is in communication with the network and that controls a remote storage device. A browser application: (a) displays a control affordance on the display device; (b) receives from the at least one user input component a selection of the control affordance; (c) starting a network block device (NBD) server on the management IHS and prompting the managed IHS to start an NBD client kernel that communicates with the NBD server; and (d) maps the remote storage device as a virtual storage device on the GUI for read and write operations using the NBD components.

18 Claims, 6 Drawing Sheets

(56) References Cited

U.S. PATENT DOCUMENTS

| | | | |
|---|---|---|---|
| 2015/0039871 A1 | 2/2015 | Shetty et al. | |
| 2015/0160690 A1 | 6/2015 | Kagy et al. | |
| 2015/0163282 A1* | 6/2015 | Siegman | G06F 3/0605 709/208 |
| 2015/0281292 A1* | 10/2015 | Murayama | H04L 65/403 715/753 |
| 2015/0295994 A1* | 10/2015 | Siegman | G06F 17/30076 709/203 |
| 2016/0117519 A1* | 4/2016 | Hashii | G06F 21/6218 713/166 |
| 2016/0241432 A1* | 8/2016 | Vidyadhara | H04L 41/0803 |
| 2016/0301768 A1* | 10/2016 | Garces-Erice | H04L 67/1097 |

* cited by examiner

BROWSER-BASED VIRTUAL MEDIA ADMINISTRATION

BACKGROUND

1. Technical Field

The present disclosure relates in general to remote information handling system (IHS) administration, and more particularly to remote IHS administration of virtual media.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communication. In addition, IHSs may include a variety of hardware and software components that may be configured to process, store, and communicate information and may include one or more computer systems, data storage systems, and networking systems.

One example of an information handling system is a server, which is typically dedicated to running one or more services as a host on a network. The advent of cloud computing in recent years has made the use of servers increasingly common. As a result, it is not unusual for hundreds, if not thousands, of servers to be deployed in a given data center. Historically, servers were locally managed by an administrator through a shared keyboard, video display, and mouse (KVM). Over time, remote management capabilities evolved to allow administrators to monitor, manage, update and deploy servers over a network connection.

One example of these capabilities is the use of a remote access controller (RAC), which is operably coupled to, or embedded within, the server and remotely accessed by an administrator via an out-of-band communication link. As an example, the Integrated Dell Remote Access Controller (iDRAC) from Dell, Inc. has its own processor, memory, network connection, and access to the system bus. Integrated into the motherboard of a server, the RAC can provide out-of-band management facilities that allow administrators to deploy, monitor, manage, configure, update, troubleshoot and remediate the server from any location, and without the use of agents. As an example, multiple servers (e.g., blade servers) may be associated with a server chassis.

Accordingly, the use of a RAC for remote management of a server, or multiple servers associated with a server chassis, in a data center can be advantageous. However, use of the RAC can also present challenges. Dell introduced its virtual console (vConsole) solution though Virtual Network Computing (VNC) based remote console. VNC is a graphical desktop sharing system that uses the Remote Frame Buffer protocol (RFB) to remotely control another computer. VNC transmits the keyboard and mouse events from one computer to another, relaying the graphical screen updates back in the other direction, over a network. VNC is platform-independent. There are clients and servers for many graphical user interface (GUI)-based operating systems and for JAVA. Multiple clients may connect to a VNC server at the same time. Popular uses for this technology include remote technical support and accessing files on a work computer from a home computer, or vice versa. However, customers who wants to use virtual media (vMedia) would need to launch a legacy third party application. The generally-known methods require plug-in installation and are platform dependent.

Current virtual media (vMedia) implementation is supported only through installation of an ActiveX or java plug-in at a management station. Local administrative rights for the management station is required. Also, the existing JAVA based interface looks outdated with limited user feedback. Present solution can attach only one vMedia device/image at a time, highly limiting modern use cases. For example, deploying an operating system (OS) image span across multiple ISO images requires user intervention at the middle of an OS deployment. An ISO image is an archive file of an optical disc, which is a type of disk image composed of the data contents from every written sector on an optical disc, including the optical disc file system. There is no drag and drop of file/image/media available with the existing solution.

BRIEF SUMMARY

In accordance with the teachings of the present disclosure, a management information handling system (IHS) is provided for controlling virtual media. In one or more embodiments, the management IHS includes a display device that displays a graphical user interface (GUI). At least one user input component is capable of manipulating and/or interfacing with one or more items on the GUI. A network interface enables communication with a network and a managed IHS that is in communication with the network and which controls a remote storage device. A browser application incorporates a network block device (NBD) server. A processor is in communication with the display device, the memory, the at least one user input component and the network interface. The processor executes the browser application to configure the management IHS to: (a) display a control affordance on the display device; (b) receive from the at least one user input component a selection of the control affordance; and (c) map the remote storage device as a virtual storage device on the GUI for read and write operations by starting the NBD server on the management IHS and prompting the managed IHS to start an NBD client kernel that is in communication with the NBD server.

In accordance with embodiments of the present disclosure, a managed IHS is provided for controlling virtual media. In one or more embodiments, the management IHS includes a local storage device. The managed IHS includes a network interface enabling communication with a network and a management IHS that is in communication with the network and that includes a display device that provides displays a GUI and at least one user input component capable of manipulating and/or interfacing with one or more items on the GUI. The managed IHS includes virtual media program modules, including an NBD client kernel. The managed IHS includes a RAC having a processor in communication with the local storage device, the memory, and the network interface. The processor executes the virtual media program modules to configure the managed IHS to receive a prompt from an NBD server executing on the management IHS in response to a browser application executing on the management IHS. The browser application displays a control affordance on the GUI of the display device and receives from the at least one user input component a selection of the control affordance. The managed IHS begins a communication session with the NBD server on the management IHS to support mapping of the local storage device as a virtual storage device on the GUI for read and write operations.

According to illustrative embodiments of the present disclosure, a method is provided of controlling virtual media in an IHS. In one or more embodiments, the method includes a display device displaying a control affordance on GUI of a management IHS. At least one user input component receives a selection of the control affordance. The management IHS starts an NBD server on a browser application and prompts a managed IHS to start an NBD client kernel that is in communication with the NBD server. The management IHS maps a remote storage device on the managed IHS as a virtual storage device on the GUI for read and write operations by using the NBD server and NBD client kernel.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
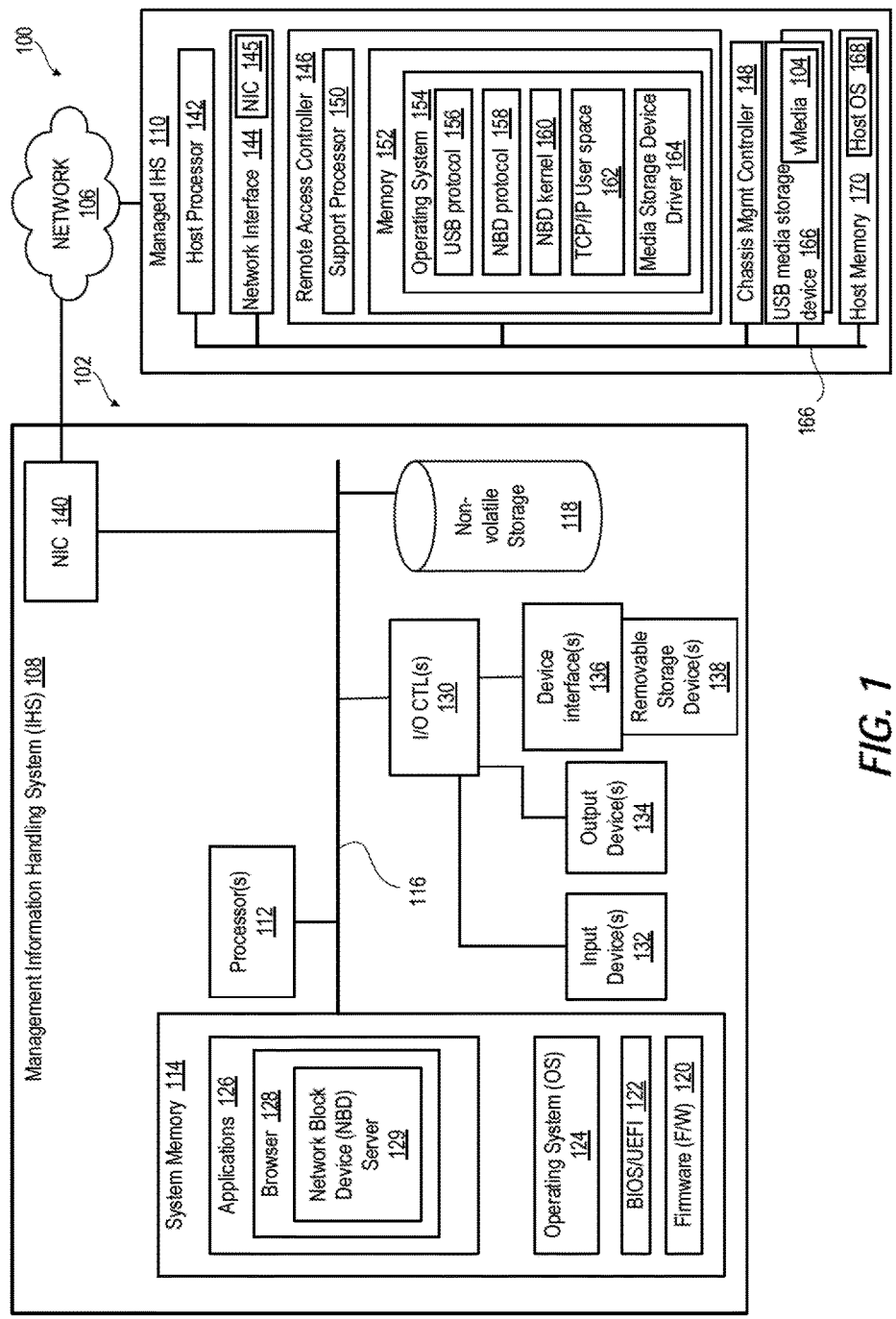
FIG. 1 illustrates a block diagram representation of an example information handling system (IHS) having a networked management IHS in network communication with a managed IHS, according to one or more embodiments.

An information handling system (IHS) provides graphical user interface (GUI)-controlled virtual media between a networked management IHS and a second managed IHS. A display device displays the GUI. At least one user input component is capable of manipulating and/or interfacing with one or more items on the GUI. A network interface enables communication with a network and a managed IHS that is in communication with the network and that controls a remote storage device. A browser application executing on the networked management IHS: (a) displays a control affordance on the display device; (b) receives from the at least one user input component a selection of the control affordance; and (c) maps the remote storage device as a virtual storage device on the GUI for read and write operations by starting a network block device (NBD) server on the networked management IHS and prompting the managed IHS to start an NBD client kernel that communicates with the NBD server.

According to one aspect, the present innovation also provides for attaching vMedia through dragging and dropping management client's devices "media/file/ISO" image onto the virtual media HTML5 browser page to redirect the same. The corresponding media will be seamlessly mounted onto the remote host environment in its original file format without any additional user operation. The device will be shown up to the host pre-boot environment as well as post OS environment to support an OS installation or maintenance.

A method provides management station "drive/file/media" redirection to remote host system by using Network Block Device (NBD) protocol and Universal Serial Bus (USB) emulation technology. A Remote Access Controller (RAC) such as integrated Dell Remote Access Controller (iDRAC) can act an NBD client. RAC can access media from a management IHS as a network device. RAC can also emulate a local storage drive for the management IHS as a virtual USB media/drive.

NBD is a device node whose content is provided by a remote machine. Typically, network block devices are used to access a storage device that does not physically reside in the local machine but on a remote machine. As an example, a local machine can access a hard disk drive that is attached to another computer. The NBD is realized by two components, the server part and the client part. On the client machine, where the device node is to work, a kernel driver/module controls the device. Whenever a program tries to access the device, the kernel driver forwards the request to the server machine, where the data physically resides. Notably, if the client part is not fully implemented in the kernel, the forwarding can be done with help of a userspace program. On the server machine, requests from the client are handled by a userspace program. The server part is just a regular userspace application because all the server part has to do is to serve network requests, which in turn just requires regular access to the server file system.

Multiple devices/ISO images can be attached to the host at the same time, whereas the older solution is capable of only one image at a time. Hence there is no waiting for a user to re-attach the next image for continuing with the installation process. By using this method there is no requirement of a client side standalone plug-in installation, hence administrative rights on client (management station) need not to be a requirement for initiating a virtual Media operation. This method gives a consistent user experience in a heterogeneous environment. Multiple devices can be attached to multiple virtual machines hosted onto the physical host server at the same time, enabling simultaneous deployment through multiple images. By adopting the proposed solution, the vMedia feature can be further leveraged to benefit an Enclosure Controller (EC) architecture. For example using the methodology described here, the same drive on a client machine can be made available to all RACs in a chassis.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized, and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only, and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more element, feature or concept of the embodiments are provided solely as examples of one implementation, and such references do not limit the extension of the claimed embodiment to embodiments in which different elements, features, protocols, or concept names are utilized. Thus, each term utilized herein is to be given its broadest interpretation given the context in which that terms is utilized.

FIG. 1 illustrates a block diagram representation of an example information handling system (IHS) 100 that includes a network block device (NBD) 102 for virtual Media (vMedia) 104 distributively formed across a network 106 between a management IHS 108 and a managed IHS 110 that is remote to the management IHS 108. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price.

Management IHS 108 includes at least one central processing unit (CPU) or processor 112 coupled to a system memory 114 via a system interconnect 116. System interconnect 116 can be interchangeably referred to as a system bus, in one or more embodiments. Also coupled to system interconnect 116 is non-volatile storage (e.g., a non-volatile random access memory (NVRAM)) 118, within which can be stored one or more software and/or firmware modules and one or more sets of data that can be utilized during operations of management IHS 108. These one or more software and/or firmware modules can be loaded into system memory 114 during operation of management IHS 108. Specifically, in one embodiment, system memory 114 can include therein a plurality of such modules, including one or more of firmware (F/W) 120, basic input/output system (BIOS) or Uniform Extensible Firmware Interface (UEFI) 122, operating system (OS) 124, and application(s) 126. One of the applications 126 is a web browser application (browser) 128 that incorporates a Network Block Device (NBD) server 129. These software and/or firmware modules have varying functionality when their corresponding program code is executed by CPU 112 or secondary processing devices within management IHS 108. For example, application(s) 126 may include a word processing application, a presentation application, and a management station application, among other applications.

Management IHS 108 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a USB, a card reader, Personal Computer Memory Card International Association (PCMCIA) slot, and/or a high-definition multimedia interface (HDMI), can be associated with management IHS 108. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses.

Management IHS 108 comprises a network interface controller (NIC) 140. NIC 140 enables management IHS 108 and/or components within management IHS 108 to communicate and/or interface with other devices, services, and components that are located external to management IHS 108, such as the managed IHS 110. These devices, services, and components can interface with management IHS 108 via an external network, such as example network 106, using one or more communication protocols that include TCP/IP and NBD protocol. According to one aspect of the disclosure, NIC 140 represents a communication mechanism that enables the IHS 108 to communicate with one or more managed IHSs 110, as described in greater detail hereinafter. Network 106 can be a local area network, wide area network, personal area network, and the like, and the connection to and/or between network and management IHS 108 can be wired or wireless or a combination thereof. For purposes of discussion, network 106 is indicated as a single collective component for simplicity. However, it should be appreciated that network 106 can comprise one or more direct connections to other devices as well as a more complex set of interconnections as can exist within a wide area network, such as the Internet.

Managed IHS 110 can be a server or other suitable computing node that includes a host processor 142, a network interface 144 communicatively coupled to its associated host processor 142, and a remote access controller (RAC) 146. The host processor 142 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, host processor 142 may interpret and/or execute program instructions and/or process data stored in a memory or other computer-readable media accessible to host processor 142.

The network interface 144 may comprise any suitable system, apparatus, or device operable to serve as an interface between an associated managed IHS 110 and a private communication network internal to internal components. Network interface 144 may enable a managed IHS 110 to communicate using any suitable transmission protocol and/or standard. In some embodiments, network interface 144 may comprise one or more network interface cards, or "NICs" 145. In other embodiments, network interface 144 may comprise one or more Local Access Network (LAN)-on-motherboard (LOM) devices. In these and other embodiments, network interface 144 may include a plurality of NICs 145, LOMs, or other network interface devices, in order to provide communication redundancy or robustness.

RAC 146 may be implemented by, for example, a microprocessor, microcontroller, DSP, ASIC, EEPROM, or any combination thereof. RAC 146 may be configured to communicate with chassis management controller (CMC) 148. Such communication may be made, for example, via private management network fabric implemented using out-of-band switching. RAC 146 may be configured to provide out-of-band management facilities for management of managed IHS 110. Such management may be made by CMC 148 even if managed IHS 110 is powered off or powered down to a standby state. A RAC 146 may include a processor, memory, and network connection separate from the rest of its managed IHS 110. In certain embodiments, a RAC 146 may include or may be an integral part of a baseboard management controller (BMC), or a proprietary controller, such as Dell Remote Access Controller (DRAC) or an Integrated Dell Remote Access Controller (iDRAC). In one embodiment, RAC 146 includes or utilizes a support processor 150 and a memory 152 containing an OS 154 that includes USB protocol component 156, NBD protocol component 158, NBD client kernel module 160, TCP/IP user space program 162, and media storage device driver 164. The latter (media storage device driver 164) is used in communicating with USB media storage devices 166.

A system interconnect 166 can provide in-band switching and out-of-band switching. In-band switching may comprise any system, device, or apparatus configured to couple network interfaces 144 of managed IHS 110 to an external network interface such as NIC 140 and perform switching between network interface 144 and external communication network 106 based on a network configuration of various ports (not explicitly shown). In-band switching may be provided by a network switch, Ethernet switch, PCIe switch, a generalized PC bus switch, an Infiniband switch, or other suitable switch.

Similarly, out-of-band switching may be provided by any system, device, or apparatus configured to couple RACs 146 of managed IHS 110 to CMC 148 and perform switching between RACs 146 and CMC 148 in order to (i) provide for centralized management of managed IHS 110 via a management console coupled to CMC 148 and (ii) to communicate with the host processor 142 that executes a host OS 168 which is contained in a host memory 170.

Figure 2:
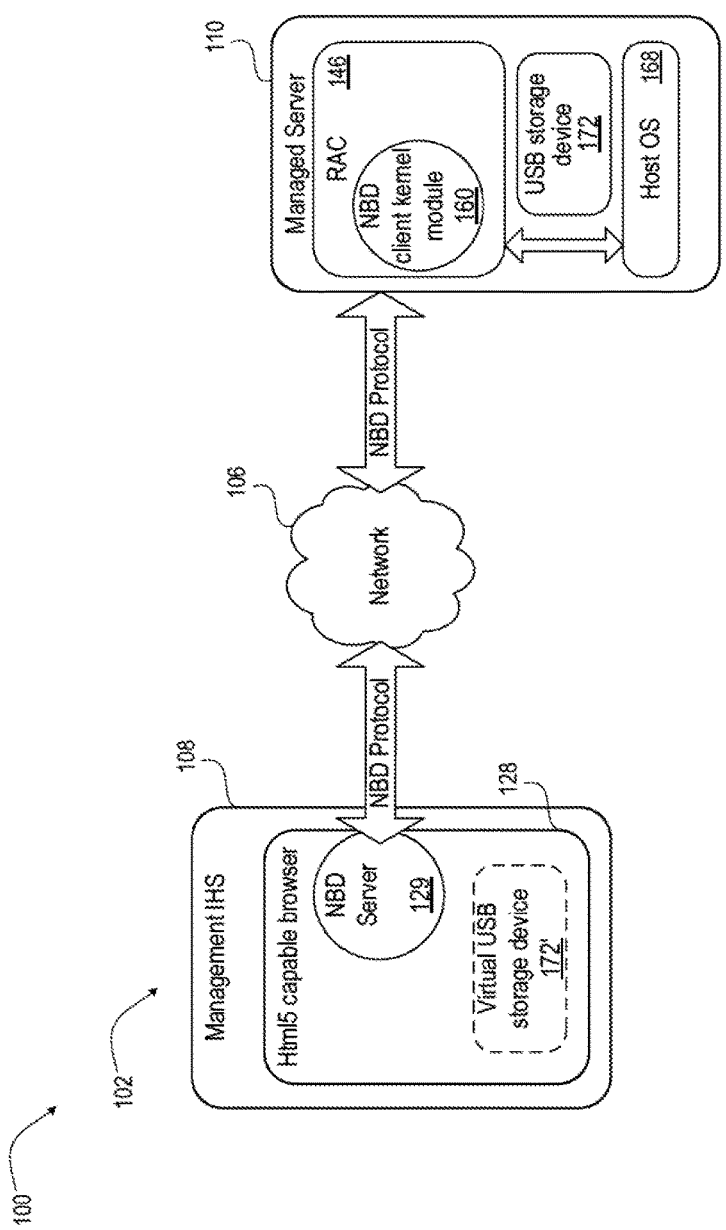
FIG. 2 illustrates a simplified block diagram of a network block device (NBD) formed across the IHS of FIG. 1 for virtual media, according to one or more embodiments.

FIG. 2 provides a simplified version of IHS 100 illustrating a browser-based virtual media (vMedia) client application, browser 128, that enables a consistent user experience. In one or more embodiments, IHS 100 provides enhanced vMedia experience by using NBD and virtual USB technology. A management IHS 108 running an NBD server 129 can be embedded into a browser 128 and connects to NBD kernel 160 running on firmware of RAC 146. In an exemplary embodiment, the browser 128 is html5 compliant. Hyper Text Markup Language fifth revision (HTML5) is a core technology markup language of the Internet used for structuring and presenting content for the World Wide Web. NBD server 129 can map any "file/image/media" from the management IHS 108 to RAC 146 as a USB storage device 172. The same USB storage device 172 can be mapped as virtual USB device 172' through RAC 146 to the host IHS 108. Once this path is established, any read/write from host IHS OS 124 (FIG. 1) to this virtual USB device 172' will be redirected to storage device 172 of the managed IHS 110. Using html5, the drag and drop of "media/image/file" contained on a management IHS 108 can be achieved.

In one or more embodiments, network block device can be a LINUX storage device node whose content is provided by a remote machine. The remote content is made available through transferring block level data over Transmission Control Protocol (TCP)/Internet Protocol (IP) (or TCP/IP) network layer. Transmission Control Protocol (TCP) and the Internet Protocol (IP) are often referred to as the Internet Model. In one or more embodiments, NBD client application and a kernel module are integrated onto RAC firmware side and an HTML5 based browser native application are integrated onto RAC GUI to act as a network block device server. These two components provides the necessary infrastructure to use NBD protocol 158 over network connection to present a remote disk/file from management station to the RAC firmware as a local block device. Apart from these two components, a vMedia session manger module can be implemented at both sides in order to initiate a session operation and keep sessions and user actions in check.

In one or more embodiments, NBD server 129 can be a RAC graphical user interface (GUI) providing a user facing front end that introduces an affordance as a vMedia launch button. When clicked, an html5 based GUI page can pop up to manage the vMedia natively without any Java/ActiveX plugin installation. This new browser window can have a "Browse" button to choose a local device/file as vMedia to be attached to the managed server host. The page can also accept any local file system entries as a device to be mapped by simple drag and drop anywhere on the page frame by using the File API of HTML5.

Figure 3:
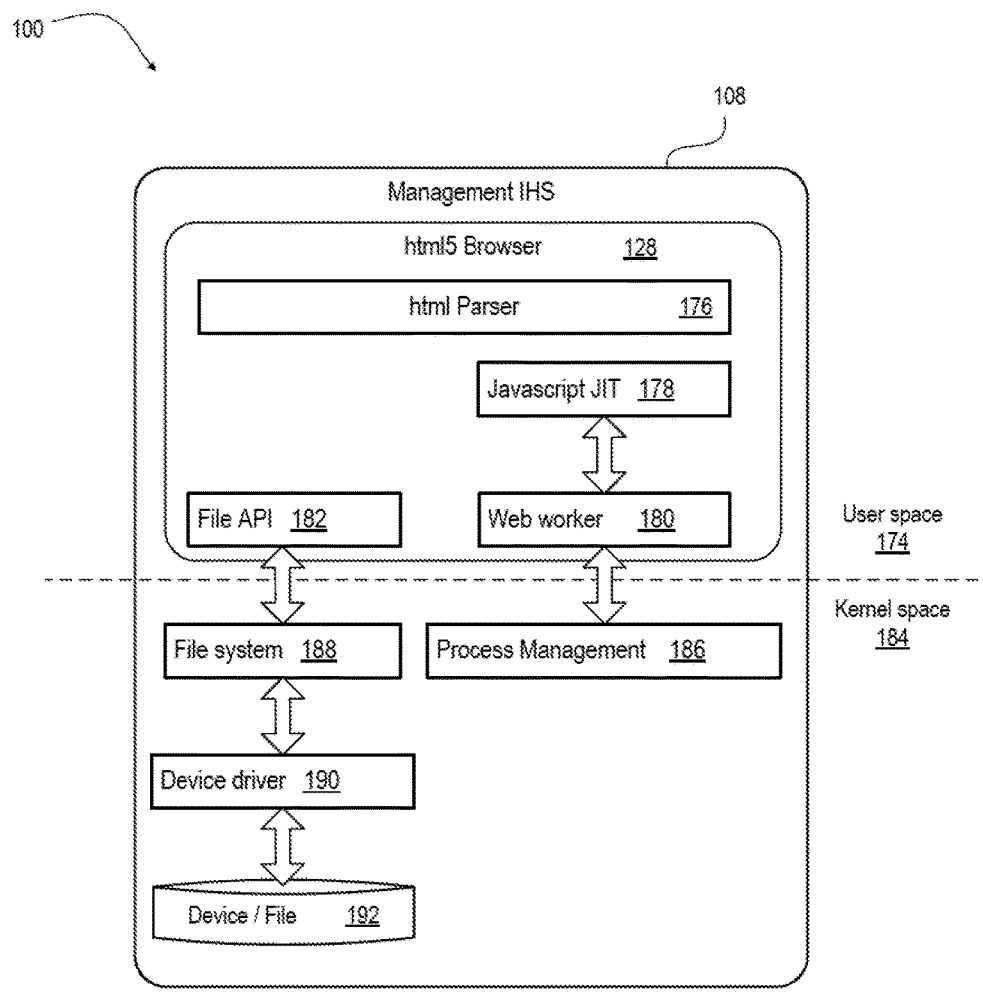
FIG. 3 illustrates a block diagram of a management IHS of FIG. 1, according to one or more embodiments.

FIG. 3 illustrates the management IHS 108 as presenting an HTML5 browser 128 in a user space 174 and that incorporates an html parser 176, Javascript Just-in-Time (JIT) compiler 178, web worker 180, and a file Application Programming Interface (API) 182. A kernel space 184 includes a process management component 186, a file system 188, a device driver 190, and a device/file 192. For sending the device data over network through NBD protocol 158, an NBD server user application is run on the machine where the drive/file resides. This can be achieved by writing an NBD server application as a web worker thread. A web worker 180 is an html5 feature in which a JavaScript can be run in the background, without affecting the performance of the page. This worker can also provide feedback to the parent page through notifications to denote the progress of operation. Using sub worker feature, the application performance can be further improved as the OS 124 (FIG. 1) will spin new thread for a sub worker thread. Multiple instances of NBD server 129 (FIG. 2) can be run as more devices are added, which eliminates the current limitation of one mapped device at a time. In order to use read and write to device/file 192 on local file system 188 via the device driver 190, html5 file API 182 can be used to provide necessary infrastructures to implement the NBD server in user space 174 without having to develop any native drivers.

Figure 4:
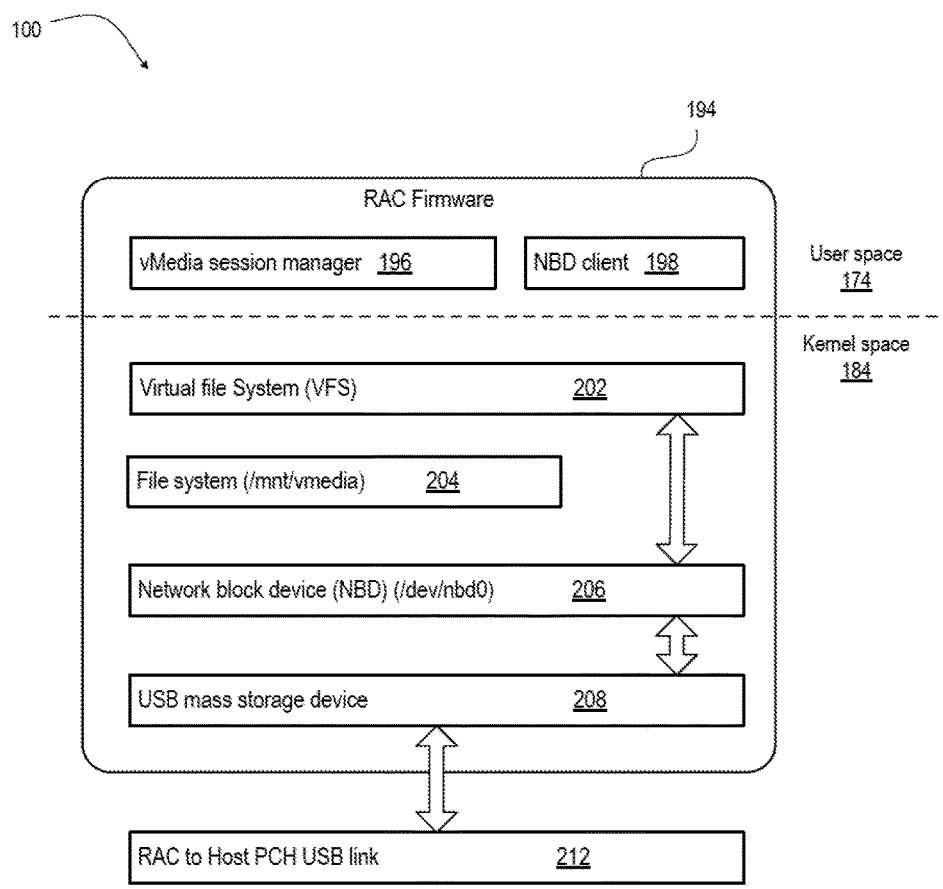
FIG. 4 illustrates another block diagram of a managed IHS of FIG. 1, according to one or more embodiments.

FIG. 4 illustrates an embodiment of RAC firmware 194 having a vMedia session manager 196 and NBD client 198 in a user space 174 and a Virtual File System (VFS) 202, file system (/mnt/vmedia) 204, NBD (/dev/nbd0) 206, and USB mass storage device 208 in a kernel space 184. The RAC firmware 194 communicates via a RAC-to-host Platform Controller Hub (PCH) USB link 212. In order to get NBD 206 working in an exemplary embodiment, kernel support is enabled through RAC kernel configuration. Enabling configuration item CONFIG_BLK_DEV_NBD in kernel configuration will provide necessary kernel support and will also emulate a block device /dev/nb0. With the help of a suitable file system, this device can be accessible from the user application as if the device was a local file. The nbd-client user mode package can provide the necessary infrastructure to emulate a device on RAC space as a block device. After making sure the nbd kernel module is interested and a device node is created, by running the below command:

nbd-client [managementStation_IP] [Portno]/dev/nbd0 the RAC side client will establish a connection with the actual device/file at management station.

The nbd-client user application provides necessary infrastructure to negotiate a connection with the server running on the machine where the actual device/file is present. The application issues a series of IOCTL (Input/Output Control) calls to the NBD kernel module 160 in RAC to facilitate the data read/write operation. This virtual USB storage device 172' carries the same properties of the remote media, by simply mounting a virtual USB storage device 172' onto a local file system node the drive can be accessible to RAC. The system behavior resembles the attach operation of a master partition to the host computer. The RAC NBD device can be mounted as virtual USB device to the Host system as the RAC USB bus is hard wired to host USB subsystem. The virtual device will be available to host OS as if the virtual device is a local device. Any read/write request on the USB mass storage device by the host OS will be seamlessly transitioned into a block I/O call on the /dev/nb0. The bulk I/O transition will be handled by the RAC Kernel module itself with the help of a file system. Eventually the request/ data will be passed onto the remote machine through NBD data transfer commands.

Figure 5:
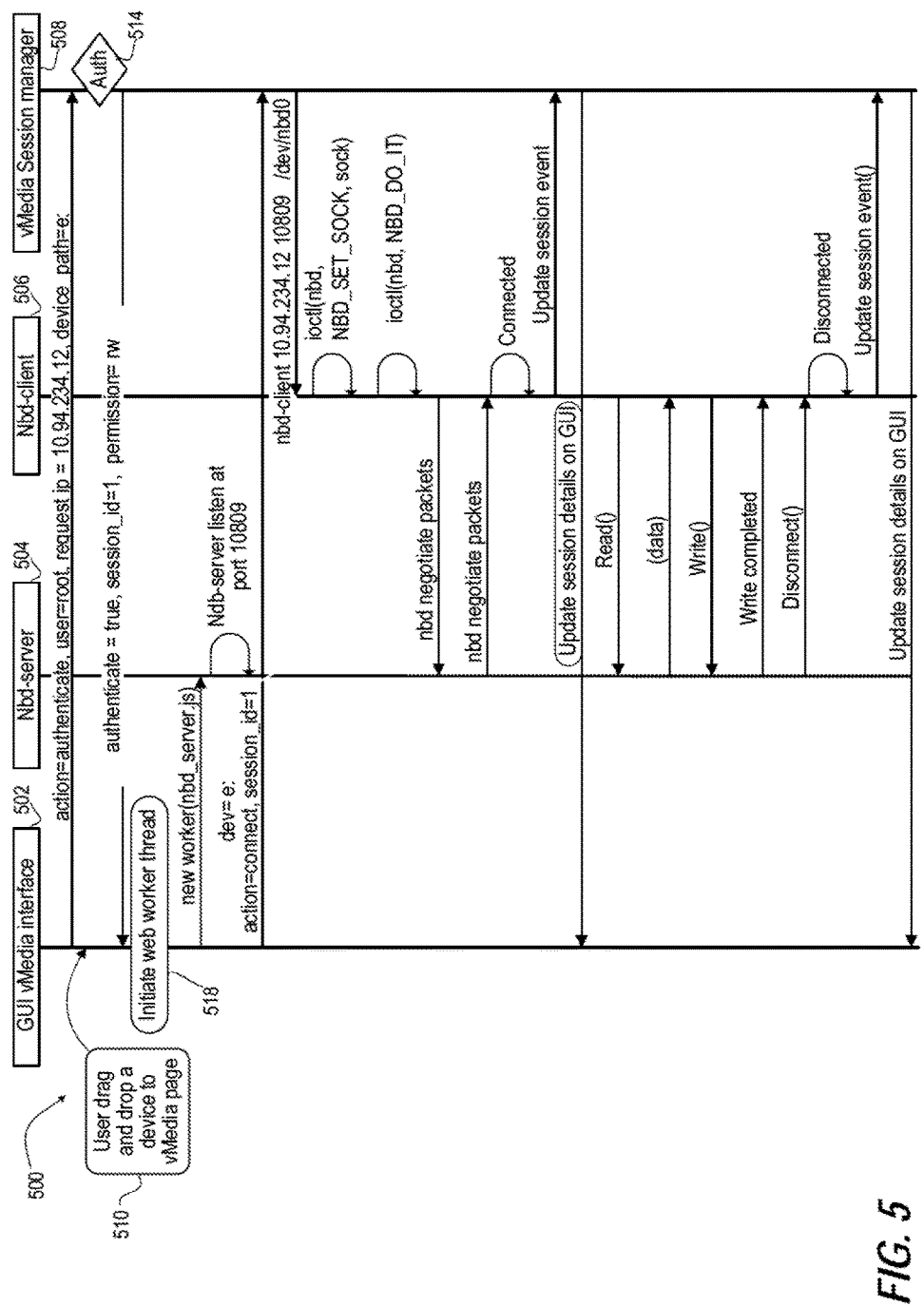
FIG. 5 illustrates a message sequence diagram of a virtual media (vMedia) session between a GUI vMedia interface, NBD server, NBD client, and a vMedia session manager, according to one or more embodiments.

FIG. 5 illustrates a message flow diagram 500 of providing vMedia via interactions of GUI vMedia interface ("front end") 502, NBD-server instant 504, NBD-client instant 506 and vMedia Session manager 508. A user mode daemon in RAC firmware can facilitate the connection requests and impose administrative restrictions for the vMedia usage. Since an NBD negotiation needs to be initiated by the client running on the RAC firmware, the user mode daemon in RAC firmware also helps to trigger a vMedia connection request by creating a NBD-client instant 506 with all required option parameters already collected from the GUI front end running on management station. For data exchange, vMedia session manager 508 uses existing web-server based data exchange as in any other GUI page. The following sequence diagram shows the block level exchanges in its actual sequence to capture an end to end operation sequence.

The operation is triggered by a drag and drop/browse button user action on RAC GUI vMedia page. The GUI vMedia interface 502 compiles the request and send an authentication request to vMedia session manager running on RAC through the web-server. Upon receiving the request, the vMedia session manager 508 checks the authenticity of the request and also checks if the number of simultaneous sessions for a particular user exceeds the pre-established/pre-set limits (block 514). An authentication result is compiled and send back to the web-server so that the web-server can respond to the client request. If the authentication results are positive, a session ID will be issued in the response message, and the session ID needs to be used for all future transactions for the same session operations going forward.

Once authentication is completed, the front end GUI vMedia interface 502 will initiate a web-worker thread to initiate the NBD-server at management station (block 518). This server would be implemented as a native java-script, which in turn can spin more sub-worker threads in order to boost the performance. After receiving the worker ready event from the web-worker module, the GUI page can send a message to vMedia session manager signifying a need to establish an NBD-client connection at a specified port number (block 520). The vMedia session manager 508 takes actions to start an NBD-client instance and wait for the client to complete the connection negotiation with the server. The session negotiation is handled at the user application, while the data transfer is done at the kernel module level. This switching from the user application to the kernel module level will take place through a series of IOCTL calls from the NBD-client program to the kernel module. Once the client module is ready for a data exchange, the vMedia session manager will send a response back to the front end GUI to reflect the connection status to the web page. Subsequently, the NBD-client can issue a request for block data read/write using command sets of the NBD protocol. A disconnect event in NBD-client can be monitored by the vMedia session manager, and necessary action will be taken depending on whether the disconnect event is due to network disturbance/erroneous transaction or due to a user disconnect action through the GUI front end.

Figure 6:
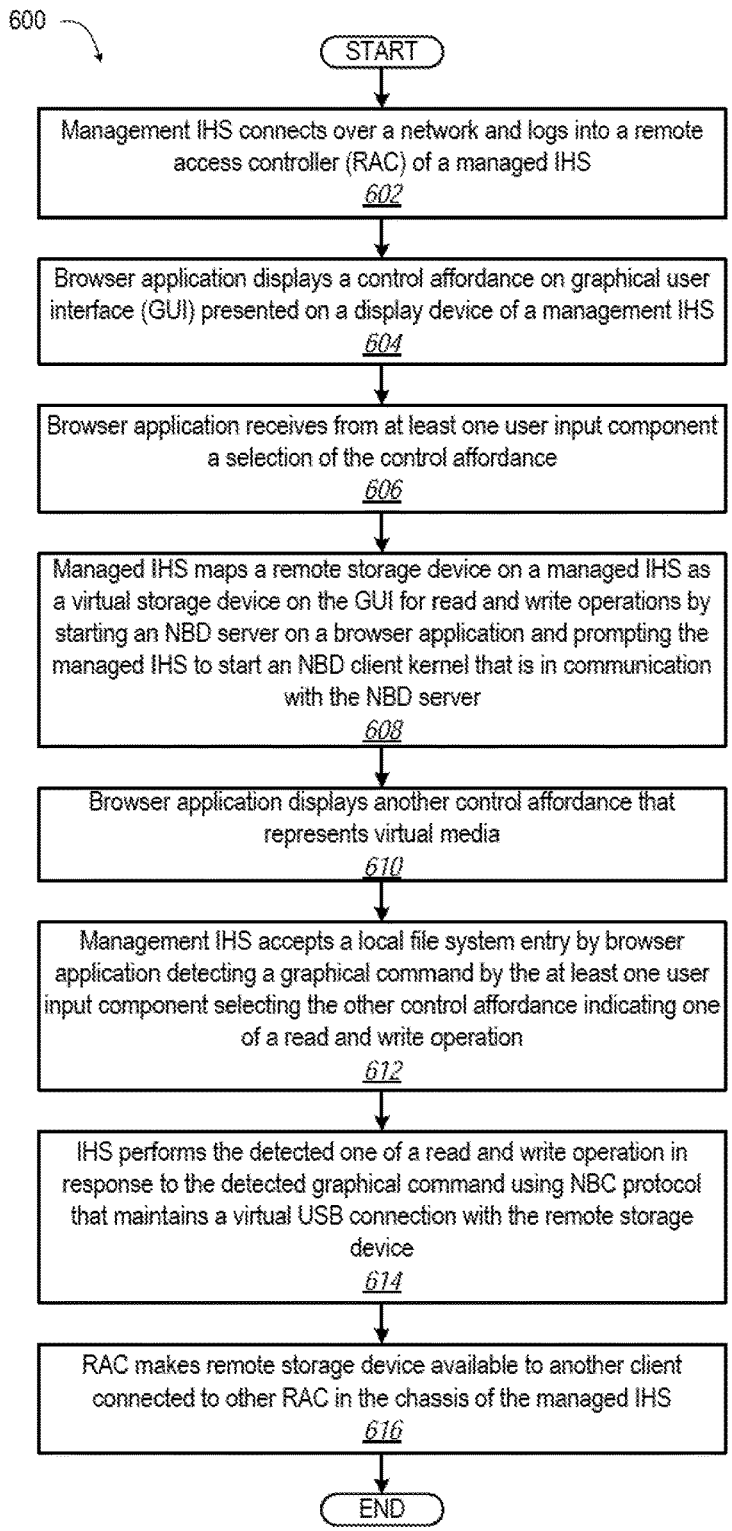
FIG. 6 illustrate a method of controlling virtual media across a networked IHS, according to one or more embodiments.

FIG. 6 illustrates a flowchart of an exemplary method 600 by which processors 112, 150 (FIG. 1) within the preceding figures performs different aspects of the processes that enable the one or more embodiments of the disclosure. Generally, method 600 represents a computer-implemented method. The description of method 600 is provided with general reference to the specific components illustrated within the preceding FIGS. 1-5. Generally method 600 is described as being implemented via processor 112, 150 (FIG. 1) and particularly the execution of code provided by the browser 128 (FIG. 1) within processor 112 in coordination with processor 150 (FIG. 1). The method 600 thereby provides enhanced vMedia experience by using NBD and virtual USB technology. It is however appreciated that certain aspects of the described methods may be implemented via other processing devices and/or execution of other code.

FIG. 6 illustrate a method 600 of controlling virtual media in a networked IHS that includes a management IHS and a managed IHS. In one or more embodiments, the method 600 includes the management IHS connecting over a network to a managed IHS to log into a RAC (block 602). The method 600 includes a browser application displaying a control affordance on a GUI presented on a display device of a management IHS (block 604). Browser application receives from at least one user input component a selection of the control affordance (block 606). Managed IHS maps a remote storage device on a managed IHS as a virtual storage device on the GUI for read and write operations by starting an NBD server on a browser application and prompting the managed IHS to start an NBD client kernel that is in communication with the NBD server (block 608). Browser application displays another control affordance that represents virtual media (block 610). Management IHS accepts a local file system entry. In particular, a browser application detects a graphical command by the at least one user input component. A user manipulates the at least one user input component to select the other control affordance indicating one of a read and write operation (block 612). IHS performs the detected one of a read and write operation in response to the detected graphical command using NBC protocol that maintains a virtual USB connection with the remote storage device (block 614). RAC can make a local storage device available to clients of other RACs that are in the chassis of the managed IHS (block 616).

In the above described flow chart of FIG. 6, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A management information handling system (IHS) for controlling virtual media, the management IHS comprising: a display device that displays a graphical user interlace (GUI); at least one user input component capable of manipulating and/or interfacing with one or more items on the GUI; a network interface enabling communication with a network and a managed IHS that is in communication with the network and which controls a remote storage device; a browser application that incorporates a network block device (NBD) server; and a processor in communication with the display device, the memory, the at least one user input component and the network interface, and that executes the browser application to configure the management IHS to: display, on the display device, a control affordance that represents virtual media; receive from the at least one user input component a selection of the control affordance; map the remote storage device as a virtual storage device on the GUI for read and write operations by starting the NBD server on the management IHS and prompting the managed IHS to start an NBD client kernel that is in communication with the NBD server; accept a local file system entry by detecting a graphical command by the at least one user input component indicating one of a read and write operation of the virtual media; and perform the detected one of a read and write operation in response to the detected graphical command.

2. The management IHS of claim 1, wherein: the managed IHS controls the remote storage device via a Universal Serial Bus (USB) connection; and the NBD server and NBD client kernel communicate via the network using NBD protocol to create a virtual USB connection between the management IHS and the remote storage device.

3. The management IHS of claim 1, wherein: the browser application comprises at least a hypertext markup language version 5 compatible browser; and the managed IHS comprises a server including a remote access controller (RAC) that executes the NBD client kernel.

4. The management IHS of claim 1, wherein the browser application includes a file application programming interface that when executed by the processor configures the management IHS to: accept the local file system entry indicated by the graphical command comprising a drag and drop operation mapped on a page frame of the GUI.

5. The management IHS of claim 1, wherein the browser application includes code that when executed by the processor configures the management IHS to: start a session manager on the management IHS and prompt the managed IHS to start a session manager; and initiate a session operation between the session managers to manage one or more sessions and user actions.

6. A managed information handling system (IHS) for controlling virtual media, the management IHS comprising: a local storage device; a network interface enabling communication with a network and a management IHS that is in communication with the network and that includes a display device that displays a graphical user interface (GUI) and at least one user input component capable of manipulating and/or interfacing with one or more items on the GUI; a memory containing virtual media program modules including a network block device (NBD) client kernel; and a remote access controller (RAC) having a processor in communication with the local storage device, the memory, and the network interface, and that executes the virtual media program modules to configure the managed IHS to: receive a prompt from an NBD server executing on the management IHS in response to a browser application executing on the management IHS displaying, on the GUI of the display device, a control affordance that represents virtual media and receiving from the at least one user input component a selection of the control affordance; and begin a communication session with the NBD server on the management IHS to support mapping of the local storage device as a virtual storage device on the GUI for read and write operations; accept a local file system entry by detecting a graphical command by the at least one user input component indicating one of a read and write operation of the virtual media; and perform the detected one of a read and write operation in response to the detected graphical command.

7. The managed IHS of claim 6, wherein: the managed IHS controls the local storage device via a Universal Serial Bus (USB) connection; and the NBD server and NBD client kernel communicate via the network using NBD protocol to create a virtual USB connection between the management IHS and the remote storage device.

8. The managed IHS of claim 6, wherein: the browser application comprises at least a hypertext markup language versions compatible browser.

9. The managed IHS of claim 6, wherein the program modules include code that when executed by the processor configures the management IHS to: start a session manager on the managed IHS, and maintain a session operation between the session managers to manage one or more sessions and user actions.

10. The managed IHS of claim 9, wherein the program modules include code that when executed by the processor configures the managed IHS to: detect an interruption of the session operation between session managers; determine whether the interruption was due to a user action or a network disruption; and terminating the session operation in response to determining that the interruption was due to user action.

11. A method of controlling virtual media in an information handling system (IHS), me method comprising: displaying, on graphical user interface (GUI) presented on a display device of a management HIS, a control affordance that represents virtual media; receiving from at least one user input component a selection of the control affordance; starting a network block device (NBD) server on a browser application and prompting a managed IHS to start an NBD client kernel that is in communication with the NBD server; mapping a remote storage device on the managed IHS as a virtual storage device on the GUI for read and write operations by using the NBD server and NBD client kernel; accepting a local file system entry by detecting a graphical command by the at least one user input component selecting the other control affordance, which indicates one of a read and a write operation of the virtual media; and performing the detected one of a read and a write operation in response to the detected graphical command.

12. The method of claim 11, wherein: the managed IHS controls the remote storage device via a Universal Serial Bus (USB) connection; and communicating by the NBD server to the NBD client kernel via a network using NBD protocol; and creating a virtual USB connection between the management IHS and the remote storage device.

13. The method of claim 11, wherein: the browser application composes at least a hypertext markup language version 5 compatible browser; and the managed IHS comprises a server including a remote access controller (RAC) that executes the NBD client kernel.

14. The method of claim 11, wherein: accepting the local file system entry indicated by the graphical command comprises receiving a drag and drop operation that is mapped on a page frame of the GUI.

15. The management IHS of claim 11, further comprising: starting a session manager on the management IHS and prompting the managed IHS to start a session manager; and initiating a session operation between the session managers to manage one or more sessions and user actions.

16. The method of claim 15, further comprising: detecting an interruption of the session operation between session managers; determining whether the interruption was due to a user a et ion or a network disruption; and terminating the session operation in response to determining that the interruption was due to user action.

17. The management HIS of claim 1, wherein the NBO server is a RAC graphical user interface (GUI) providing a user facing front end that introduces an affordance as a vMedia launch button, which when clicked, enables an html5 based GUI page to open up to manage the vMedia natively without any Java/ActiveXplugin installation.

18. The management HIS of claim 1, wherein: a new browser window has a "Browse" button to choose a local device/fife as vMedia to be attached to the managed server host; and the page also accepts any local file system entries as a device to be mapped by simple drag and drop anywhere on a page frame by using a File API of HTML5.

* * * * *

UNITED STATES PATENT AND TRADEMARK OFFICE
CERTIFICATE OF CORRECTION

PATENT NO. : 10,178,170 B2  
APPLICATION NO. : 14/853960  
DATED : January 8, 2019  
INVENTOR(S) : Harikrishnan A. Rajagopalan and Rajeshkumar Ichchhubhai Patel Page 1 of 1

It is certified that error appears in the above-identified patent and that said Letters Patent is hereby corrected as shown below:

In the Claims

Column 14, Claim 16, Line 48, after "a user" delete "a et ion".
Column 14, Claim 16, Line 48, after "a user" insert --action--.
Column 14, Claim 17, Line 51, after "The management" delete "HIS".
Column 14, Claim 17, Line 51, after "The management" insert --IHS--.
Column 14, Claim 17, Line 51, after "wherein the" delete "NBO".
Column 14, Claim 17, Line 51, after "wherein the" insert --NBD--.
Column 14, Claim 17, Line 56, after "Java/ActiveX" insert a space.
Column 14, Claim 18, Line 57, after "The management" delete "HIS".
Column 14, Claim 18, Line 57, after "The management" insert --IHS--.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*